Feb. 23, 1965     I. L. BERKOWITZ     3,170,742
DISPLAY AND STORAGE FIXTURES
Filed April 14, 1961     7 Sheets-Sheet 1

INVENTOR.
IRVING L. BERKOWITZ
BY
J.B.Felshin
ATTORNEY.

Feb. 23, 1965     I. L. BERKOWITZ     3,170,742

DISPLAY AND STORAGE FIXTURES

Filed April 14, 1961     7 Sheets-Sheet 3

INVENTOR.
IRVING L. BERKOWITZ

BY

*J. B. Feldman*

ATTORNEY.

Feb. 23, 1965 I. L. BERKOWITZ 3,170,742
DISPLAY AND STORAGE FIXTURES
Filed April 14, 1961 7 Sheets-Sheet 4

INVENTOR.
IRVING L. BERKOWITZ
BY
*J.B. Felshin*
ATTORNEY.

Feb. 23, 1965     I. L. BERKOWITZ     3,170,742
DISPLAY AND STORAGE FIXTURES
Filed April 14, 1961     7 Sheets-Sheet 5

INVENTOR.
IRVING L. BERKOWITZ
BY
ATTORNEY.

Feb. 23, 1965     I. L. BERKOWITZ     3,170,742
DISPLAY AND STORAGE FIXTURES
Filed April 14, 1961     7 Sheets-Sheet 6

INVENTOR.
IRVING L. BERKOWITZ
BY
ATTORNEY.

Feb. 23, 1965     I. L. BERKOWITZ     3,170,742

DISPLAY AND STORAGE FIXTURES

Filed April 14, 1961     7 Sheets-Sheet 7

INVENTOR.
IRVING L. BERKOWITZ

BY

*J.B. Keeshin*
ATTORNEY.

United States Patent Office 3,170,742
Patented Feb. 23, 1965

3,170,742
DISPLAY AND STORAGE FIXTURES
Irving L. Berkowitz, Oceanside, N.Y., assignor to Kason Display Hardware Inc., Brooklyn, N.Y., a corporation of New York
Filed Apr. 14, 1961, Ser. No. 103,155
20 Claims. (Cl. 312—108)

This invention relates to display and storage fixtures such as counters, modular walls, islands, half gondolas, lowboys and end units for mass merchandising in the modern store.

An object of this invention is to provide a device of the character described constructed of modular units with interlocking means to permit building up devices of various sizes and shapes.

Another object of this invention is to provide fixtures of the character described which shall be flexible, versatile, which may be easily and speedily assembled or disassembled, which shall provide massive display areas and maximum storage space, which may be compactly stored, which shall be low in cost and which shall be easy to keep clean.

Yet another object of this invention is to provide a strong and durable fixture of the character described which may be readily "tailored" to changing needs by adding, subtracting or re-arranging the modular units, which shall permit adding hardware for over counter arrangements, which shall be modern and attractive in appearance, easy to manipulate, which may be shipped in knock-down condition and set up by means of instructions without necessity for training or special skills or tools, and which shall require a minimum of basic modular units, to put together a large variety of composite fixtures, and which shall be practical and efficient to a high degree in use.

Other objects of this invention will in part be obvious and in part hereinafter pointed out.

The invention accordingly consists in the features of construction, combinations of elements, and arrangement of parts, which will be exemplified in the construction hereinafter described, and of which the scope of invention will be indicated in the following claims.

In the accompanying drawings in which is shown an illustrative embodiment of this invention.

Referring now in detail to the drawing, 10 designates a display and storage fixture embodying the invention. Said fixture 10 may comprise three types of units, to wit, an end unit 11, a double intermediate unit 12, and an added double unit 13, assembled together, in various combinations. In the drawing, the fixture illustrated comprises one or more end units 11, one double unit 12 and one added double unit 13. However, the fixture may be made larger by adding any suitable number of added intervening double units 13 with an end unit 11 at the opposite end of the fixture.

Figure 6:
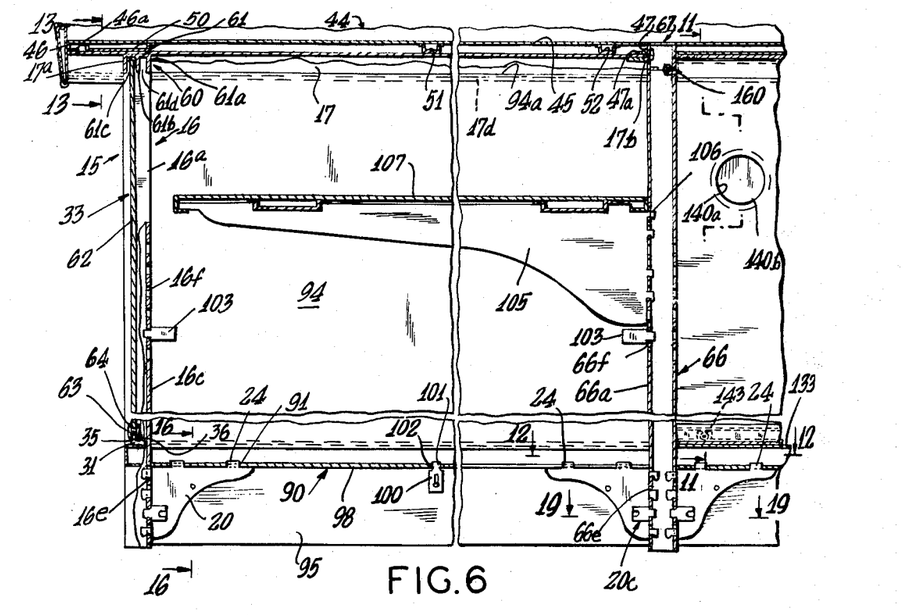
FIG. 6 is a cross-sectional view taken on line 6—6 of FIG. 3.
Figure 7:
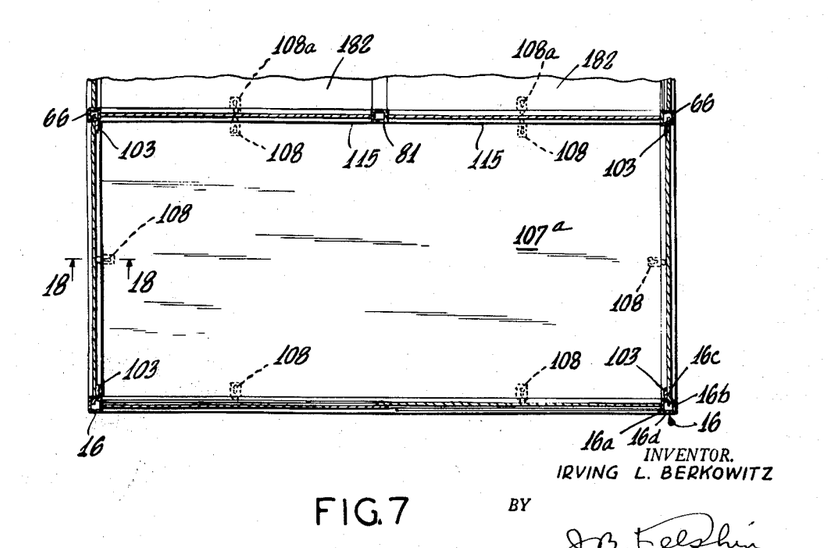
FIG. 7 is a cross-sectional view taken on line 7—7 of FIG. 5.

The end unit 11 comprises a pair of similar, symmetrical, parallel end T-upright members 15, each comprising a vertical tubular portion 16 of square cross-section, to the upper end of which is welded a top horizontal, tubular longitudinal portion 17, of square cross-section. The outer end 17a of each portion 17 is a few inches from upright portion 16, and the inner or opposite end 17b is considerably further from said upright portion. The vertical portion 16 of each member 15 has parallel walls 16a, 16b at right angles to parallel walls 16c, 16d (FIG. 7). Inner walls 16c are formed with a lower set of slots 16e (FIG. 6) and upper set of slots 16f. Inner walls 16a have lower slots 16g similar to slots 16e. Hooked into slots 16g of the uprights 16, are a pair of similar symmetrical, coplanar brackets 20 having vertically aligned hooks 21 along an outer edge, passing through said slots. Brackets 20 (FIG. 24) are formed with square notches 20a at said edges, to receive square portions 20b of locking tabs 20c. Each of said tabs has a lug 20d projecting through one of the slots 16g.

Mounted on the pair of brackets 20 is a horizontal front transverse lower connector tube 22 of square cross-section. The brackets 20 have lugs 24 at their upper edges projecting through slots 25 in the bottom wall 26 of the front connector tube 22. Fixed to the outer sides of the brackets 20 is an end kick or apron plate 30.

Figure 8:
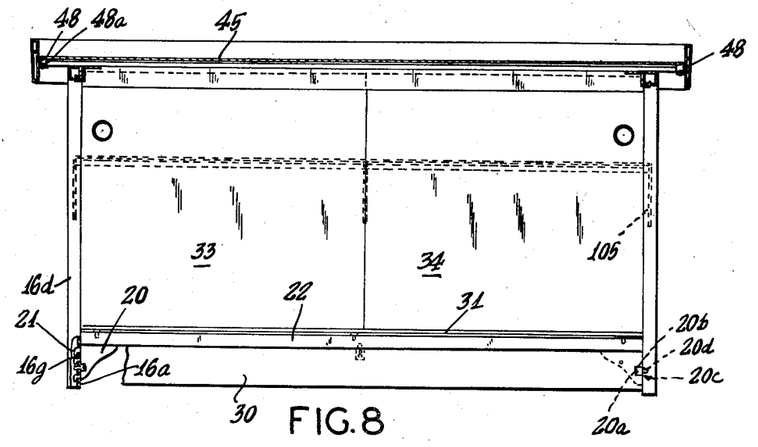
FIG. 8 is a cross-sectional view taken on line 8—8 of FIG. 3.

Mounted on top of tube 22 (FIG. 8) is a lower track 31 for a pair of sliding parallel doors 33, 34. Track 31 has parallel upstanding rails 35, 36 for the doors 33, 34, respectively.

Figure 13:
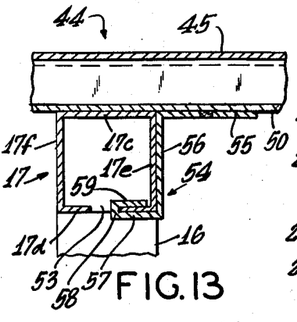
FIG. 13 is a cross-sectional view taken on line 13—13 of FIG. 6.
Figure 14:
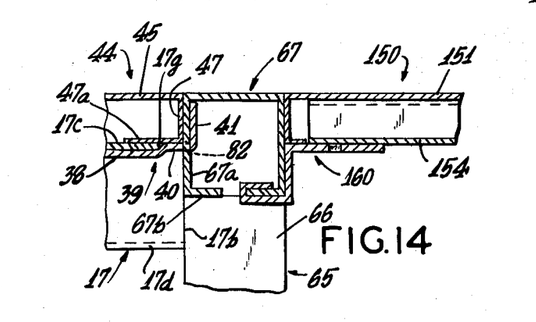
FIG. 14 is a cross-sectional view taken on line 14—14 of FIG. 9.

Portions 17 of each T-member 15 has a top wall 17c, a bottom wall 17d, and inner and outer parallel side walls 17e, 17f (FIGS. 13 and 14). Walls 17c, adjacent ends 17b, have slot 17g welded to the underside of each wall 17c adjacent slot 17g is the body 38 of a locking tab 39. Said tab 39 has an upwardly offset portion 40 received in slot 17g, and extending upwardly therefrom a finger 41 disposed in a vertical plane spaced from the end 17b of portion 17. The purpose of the locking tabs 39 will be explained hereinafter.

Mounted on the portions 17 of the members 15 is an end counter top 44. Said counter top 44 comprises a rectangular top perforated sheet metal plate 45 (FIG. 6) having side downwardly extending webs 46, 47 from which extend inwardly toward each other, coplanar flanges 46a, 47a resting on said portions 17. Counter top plate 45 extends beyond portions 17 (FIG. 8) and has end webs 48 provided with coplanar flanges 48a in the same plane as flanges 46a, 47a. Welded to the underside of top plate 45 (FIG. 6) is an elongated wider channel 50 located adjacent web 46, an intermediate narrow channel 51 and another narrow channel 51 and another narrow channel 52 adjacent web 47. Said channels 50, 51, 52 stiffen the counter top plate 45. The bottom walls of channels 50, 51, 52 rest on portions 17 of members 15. Means is provided to slidably connect the counter top 44 to the members 15. To this end, bottom walls 17d of portions 17, at the ends 17a thereof are formed with slots 53 (FIG. 13). Welded to the outer ends of undersides of channels 50 are clips 54. Each clip 54 has a tongue 55 welded to bottom wall of channel 50, from which extends down a web 56 contacting wall 17e of portion 17, and from which extends a shoulder 57 contacting the underside of wall 17d. Extending up from shoulder 57 is an offset 58 passing up through slot 53. Extending from offset 58 is a finger 59 contacting the top of wall 17d on one side of slot 53. Thus, the counter top may be slid onto portion 17, and at the end of the movement, the clips 54 will slidably engage walls 17d of portions 17 at one side of slot 53.

Welded to the underside of channel 50 (FIG. 6) and disposed between the T-members 15, is a top door track 60 having a top wall 61 from which extends downwardly outer flange 61a and a central flange 61b, thereby forming a pair of parallel guide grooves 61c, 61d in the vertical planes of rails 35, 36, respectively. Door 33 comprises a panel 62 to the lower end of which is attached a moulding 63 of H cross-section carrying rollers 64 riding on rail 35. The upper end of door panel 62 rides in groove 61c. Door 34 is similar to door 33 but rides on rail 36 and in groove 61d. The door and door supporting structure is similar to that illustrated in FIG. 11, to be described hereinafter.

The double unit 12 (FIG. 2) comprises a pair of similar, symmetrical vertical, coplanar T-members 65, each comprising a vertical tubular post 66 of square cross-section, and a horizontal tubular portion 67 of square cross-section welded to the upper end of the post.

The posts 66 are in the planes (FIG. 2) of the posts 16 of T-members 15. The portions 67 are in alignment, and in a plane somewhat above the plane of portions 17 of said members 15. The inner ends of tubular portions 67 are joined by a fitting 68 (FIG. 25) having a cubical block portion 69 from which extends outwardly, tapered plugs 70 projecting into said inner ends and frictionally engaging the inner surfaces thereof. Said fitting 68 also has a downwardly extending plug 71 and a rearwardly extending plug 72 for the purpose hereinafter appearing.

Figure 23:
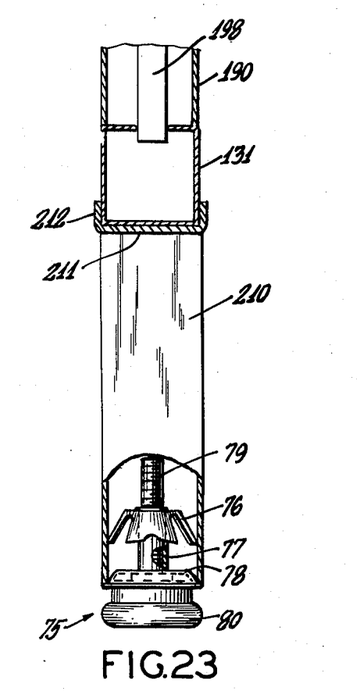
FIG. 23 is a cross-sectional view taken on line 23—23 of FIG. 2.

Legs, such as leg 75, shown in FIG. 23, may be mounted at the lower ends of posts 16, 66. Said legs 75 are vertically adjustable, having a friction grip portion 76 gripping the inside of the post, fixed to a tube 77 attached to a disc 78 contacting and closing the lower end of the post, and a screw 79 screwed within the tube, to the lower end of which is fixed a floor engaging knob 80.

A center vertical tubular post member 81 (FIG. 2) has its upper end receiving the downwardly extending plug 71, and is located in the vertical plane of posts 66.

Each of said portions 67 of members 65 is formed, just above the post 66, and on the wall 67a thereof facing the end unit 11, with a horizontal slot 82 (FIG. 14). Portion 40 of tab 39 passes through slot 82 and finger 41 engages the inner surface of the adjacent wall 67a. It will be noted that the top walls 45 of the top counters 44 are in the plane of the top walls 67b of tubular portions 67 (FIGS. 6 and 14). Thus, the locking tabs 39 serve to lock unit 11 to unit 12.

Hooked into the slots 16a of wall 16c of posts 16 are brackets 20 such as described above. Said brackets 20 have hooks 21 engaging in said slots and gripping the lower edges of said slots. Said brackets have at their upper edges, lugs 24. They are also formed with square notches 20a receiving the square bodies 20b of locking tabs 20c. Said tabs have lugs 20d passing through slots 16c to hold the brackets against lifting and unhooking.

Figures 16, 19, 20:
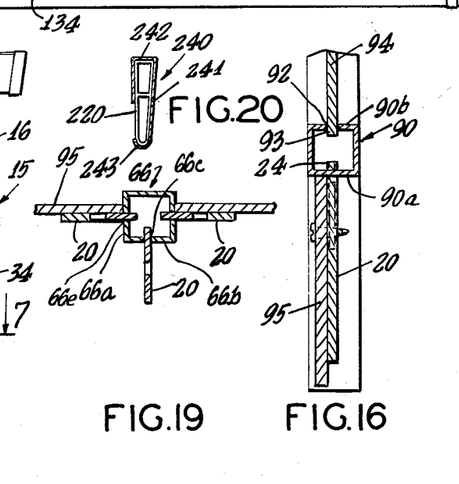
FIG. 16 is a cross-sectional view taken on line 16—16 of FIG. 6.
FIG. 19 is a cross-sectional view taken on line 19—19 of FIG. 6.
FIG. 20 is a cross-sectional view taken on line 20—20 of FIG. 4.

Posts 66 (FIG. 6) of member 65 are formed, at the lower ends of walls 66a, with slots 66e. Brackets 20 are also hooked in said slots and locked thereto by tabs 20c. Said brackets 20 also have upstanding lugs 24. Horizontal parallel tubular members 90 are mounted on the pair of brackets 20 at each side, and have slots 91 (FIG. 6) in the lower walls 90a (FIG. 16) thereof receiving the lugs 24. The top walls 90b of tubular members 90 have elongated slots 92. The lower edges 93 of panels 94 are received in said slots. Side aprons or kick plates (vertical) 95 are attached to the brackets 20 at each side. A tab (FIG. 6) fixed to the center of the upper edge of each kick plate, has a lug 101 extending up through a slot 102 in the lower wall 98 of each tubular member 90.

Locking tabs 103 (FIG. 7) fixed to the sides of panel 94 have lugs passing through slots 16f in walls 16c of posts 16 and through slots 66f in walls 66a of posts 66. The upper end edges 94a of panels 94 pass up through the longitudinal slot 53 in the lower wall 17d of tubular portion 17.

Figure 4:
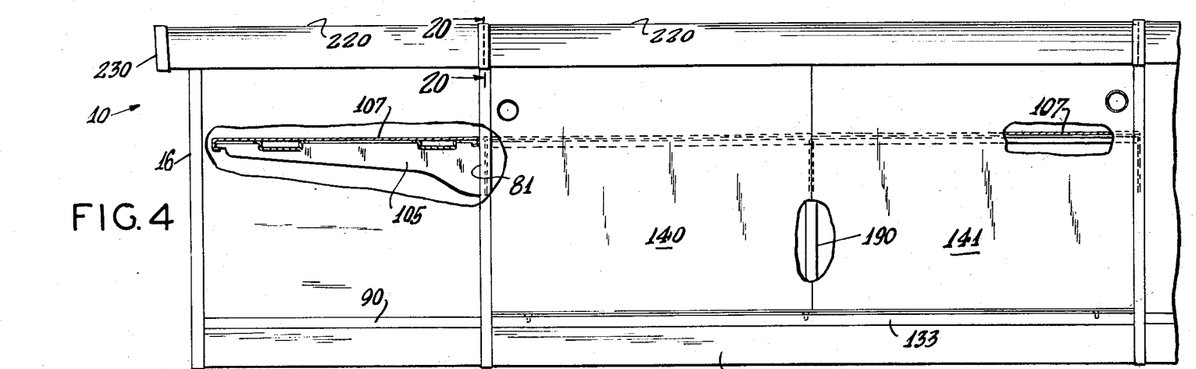
FIG. 4 is a front elevational view of the structure of FIG. 1.
Figure 5:
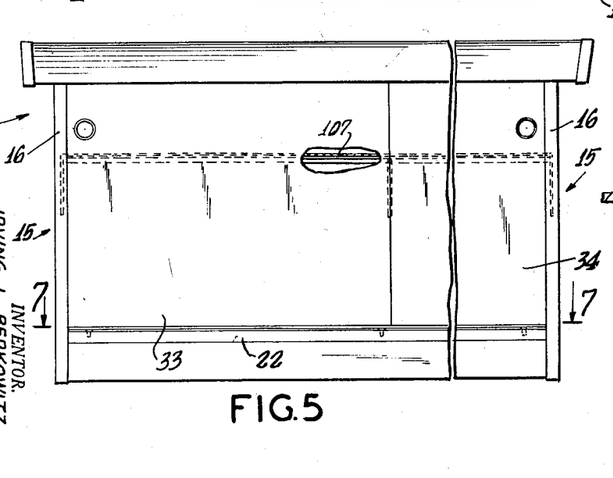
FIG. 5 is an end view of the structure of FIG. 4.

The walls 66a of posts 66 have an upper series of slots 66f. Center post 81 has similar slots. Brackets 105 have hooks 106 passing through said slots in posts 66 and 81 and grip the lower edges of slots. A shelf 107 rests on said three brackets 105 (FIGS. 4 and 6).

A bottom panel 107a of wood, composition or any other suitable material (FIG. 18) has a plurality of clips 108 screwed to its underside. Each clip has a tongue extension 109 provided with an upwardly extending finger 110. Two such lock tabs have their tongues pass through slots 111 in inner wall 112 of tubes 90 with fingers 110 engaging the inner surface of said wall. Two other such clips engage in similar slots in the inner wall of tube 22. Posts 66 comprise walls 66b formed with lower series of slots 66c for engagement with brackets 20 similar to brackets 20 described above, locked to said post by similar locking tabs 20c, similarly. Also the center post 81 is formed with similar slots opposed to slots 66c (FIG. 19) to receive similar brackets 20. Mounted on each pair of brackets 20 on posts 66 and 81 is a horizontal tubular member 115 having slots in its lower wall to receive lugs in the bracket (not shown) but similar to the mounting of tubes 22 and 90 on pairs of brackets 20.

A pair of clips 108 fixed to bottom wall or panel 107a, also engages in suitable slots in the adjacent walls of horizontal tubular members 115.

Unit 12 (FIG. 2) further comprises a pair of T-members 120 similar to T-members 65 and parallel thereto and each comprising a vertical post 121 and a horizontal top portion 122. Posts 121 are parallel to posts 66 and 16 and in the planes thereof. The portions 122 of members 120 are tied together by a fitting 123 having a cubical block 124 (see FIG. 26) from which extends downwardly, a tapered plug 125, and from which extends a pair of side plugs 126 and a pair of longitudinal plugs 127. The tapered plugs 126 are fractionally received in the inner ends of tubular portions 122. A vertical post 128 similar to post 81, has its upper end receiving the downwardly extending plug 125. A top horizontal longitudinal central tube of square cross-section 130 receives plug 72 of fitting 68 at one end, and one of the plugs 127 at its opposite end.

Symmetrically disposed brackets 20 (FIG. 2), similar to brackets 20 described above, are attached to the lower ends of posts 81, 128 and support a lower, longitudinal, horizontal, central tubular member 131 located below the upper central tube 130. Opposed symmetrical pairs of brackets 20 at the lower ends of posts 66 and 121 hookingly attached in the manner described above support longitudinal, horizontal side tubular members 133 and carry kick plates 134. On tubular members 133 (FIG. 11) are track members 136 screwed thereto by screws 137 and having parallel, upwardly projecting rails 138, 139 on which slide doors 140, 141, respectively. Said doors have H shaped mouldings 142 at their lower ends carrying grooved rollers 143 rolling on said rails.

Figure 11:
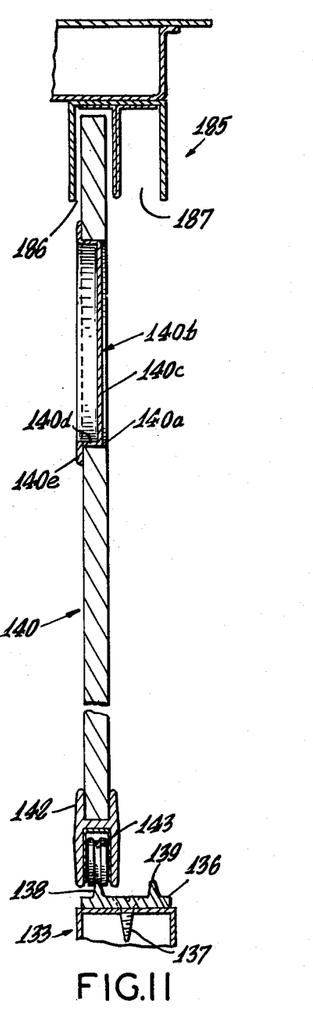
FIG. 11 is a cross-sectional view taken on line 11—11 of FIG. 6.
Figure 12:
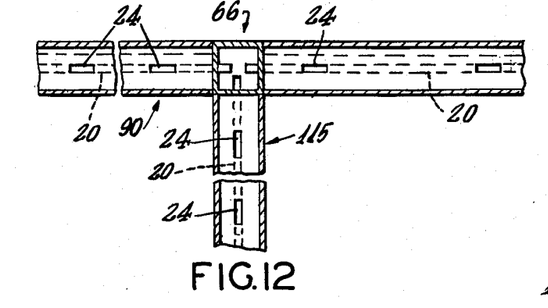
FIG. 12 is a cross-sectional view taken on line 12—12 of FIG. 6.

Each of doors 140, 141 has a round opening 140a receiving a cup-like sheet metal or plastic member 140b having a round wall 140c, a cylindrical wall 140d contacting the rim of opening 140a and an outer annular flange 140e contacting an outer surface of the door.

A pair of side counter tops 150 (FIG. 1) are slidably mounted on the portions 67 and 122 of T-members 65, 120.

Figure 17:
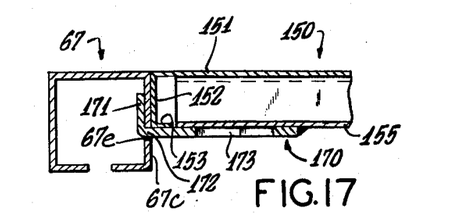
FIG. 17 is a cross-sectional view taken on line 17—17 of FIG. 3.

Counter tops 150 each comprise a top counter wall 151 having end webs 152 provided with inwardly extending flanges 153 (FIG. 17). Welded to the underside of each counter wall 151 is a wide channel 154 (FIG. 14), and a pair of narrower channels 155, 156. The surface of top wall 151 is at the plane of the tops of said portions 67, 122. Walls 151 may comprise perforated sheet metal and lie between portions 67, 122. Attached to the underside of the ends of the wide channels 154 as by welding, are clips 160 (FIG. 14) similar to clips 54 and similarly slidably engaging lower walls of portions 67 of members 65 and lower walls of portions 122. For this purpose, the lower walls of said portions 67 and 122 are longitudinally slotted to receive said clips.

Tabs 170 (FIG. 17) have fingers 171 engaging the inner surface of side walls 67c of portion 67. Said walls have slots 67e. Said tabs 170 have portions 172 passing through said slots, and horizontal portions 173 extending at right angles to the side wall 67e. The ends of channels 155 rest on the walls or portions 173 of said tabs 170. Similar tabs are similarly mounted on portions 122 to support the opposite ends of said counter tops 150.

Post 128 (FIG. 2) and posts 121 have brackets 20 mounted on the lower ends thereof to support horizontal tubular members 160a, the same way that such brackets support tubular members 115.

Figure 18:
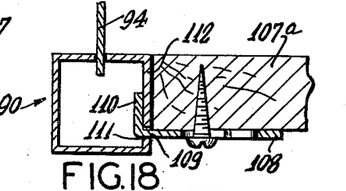
FIG. 18 is a cross-sectional view taken on line 18—18 of FIG. 7.

Mounted on tubular members 115, 133, 131 are tabs 108a similar to the tab 108 shown in FIG. 18, for supporting bottom, horizontal panels 182.

Welded to the underside of channel 154 of each counter top is a longitudinal track 185 (FIG. 11) similar to track 60 and having two downwardly opening grooves 186, 187 to receive the upper ends of doors 140, 141, respectively.

A tubular center post of square cross-section 190 (FIG. 21) is interposed between the tubular members 130, 131. In the upper end of post 190 is a plug 191 having a head 192 resting on the upper end edges of said post and contacting the underside of the middle of tube 130. Plug 191 is formed with an axial screw threaded opening 193. A screw 194 is screwed to said plug and projects up through an opening 195 in the bottom wall of tube 130 into said tube. A nut 196 screwed to the upper end of said screw presses a washer 197 against the upper surface of said bottom wall.

Figure 21:
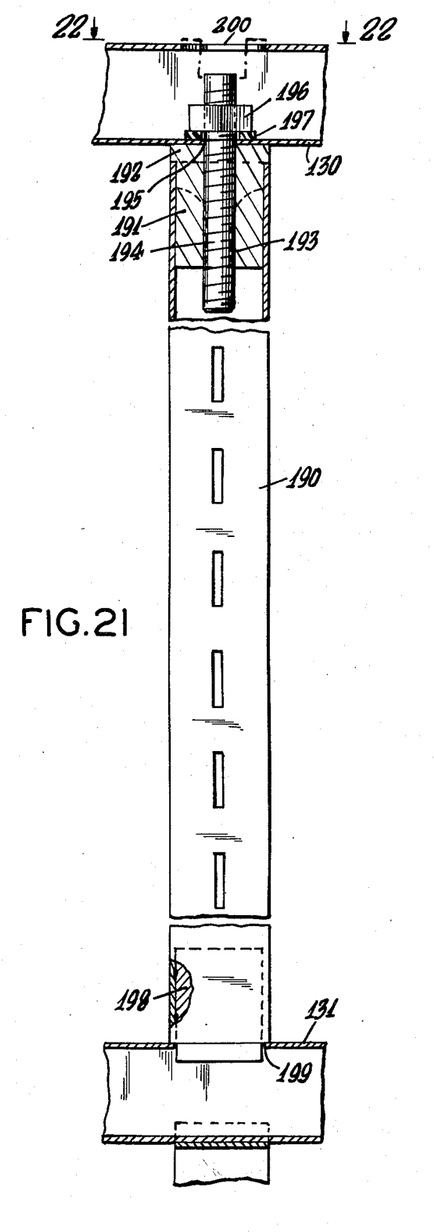
FIG. 21 is a cross-sectional view taken on line 21—21 of FIG. 2.
Figure 22:
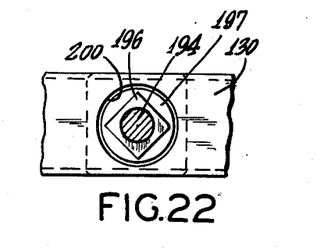
FIG. 22 is a cross-sectional view taken on line 22—22 of FIG. 21.

A short bar 198 welded within the lower end of tube 190 projects down through a slot 199 in the top wall of said tube 131. The top wall of tube 130 has a central opening 200 through which a tool may be inserted to attach the nut 196 to the screw 194.

A tubular support leg 210 in the form of a tubular member of square cross-section is placed beneath tube 131 in vertical alignment with tube 190. At the upper end of leg 210 is a plate 211 contacting the underside of tube 131 and has side flanges 212 extending upwardly and straddling said tube 131.

A leg 75 is attached to the lower end of leg 210, as it is to the lower ends of the vertical posts 16, 66, 21, 121, 128.

Figure 15:
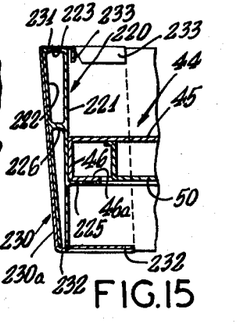
FIG. 15 is a cross-sectional view taken on line 15—15 of FIG. 3.

At the outer edges (FIG. 15) of the counter tops are moldings 220 having inner vertical walls 221 and outer upwardly and outwardly inclined walls 222, connected to the inner walls by top webs 223 and intermediate webs 226. The moldings extend above and below the counter tops. Extending from the inner walls 221 are tabs 225 attached to the undersides of the inwardly extending flanges (46a, 153). At the corners the mouldings are interconnected by sheet metal bands 230 of angle horizontal cross-section having portions 230a contacting the outer inclined surfaces of the mouldings, at the corners, and having top inwardly extending flanges 231 contacting top webs 223 and bottom curved flanges 232 contacting the under-edges of the mouldings. Top flanges 231 have downwardly extending rim edges 233.

Figures 1, 2, 24, 25, 26:
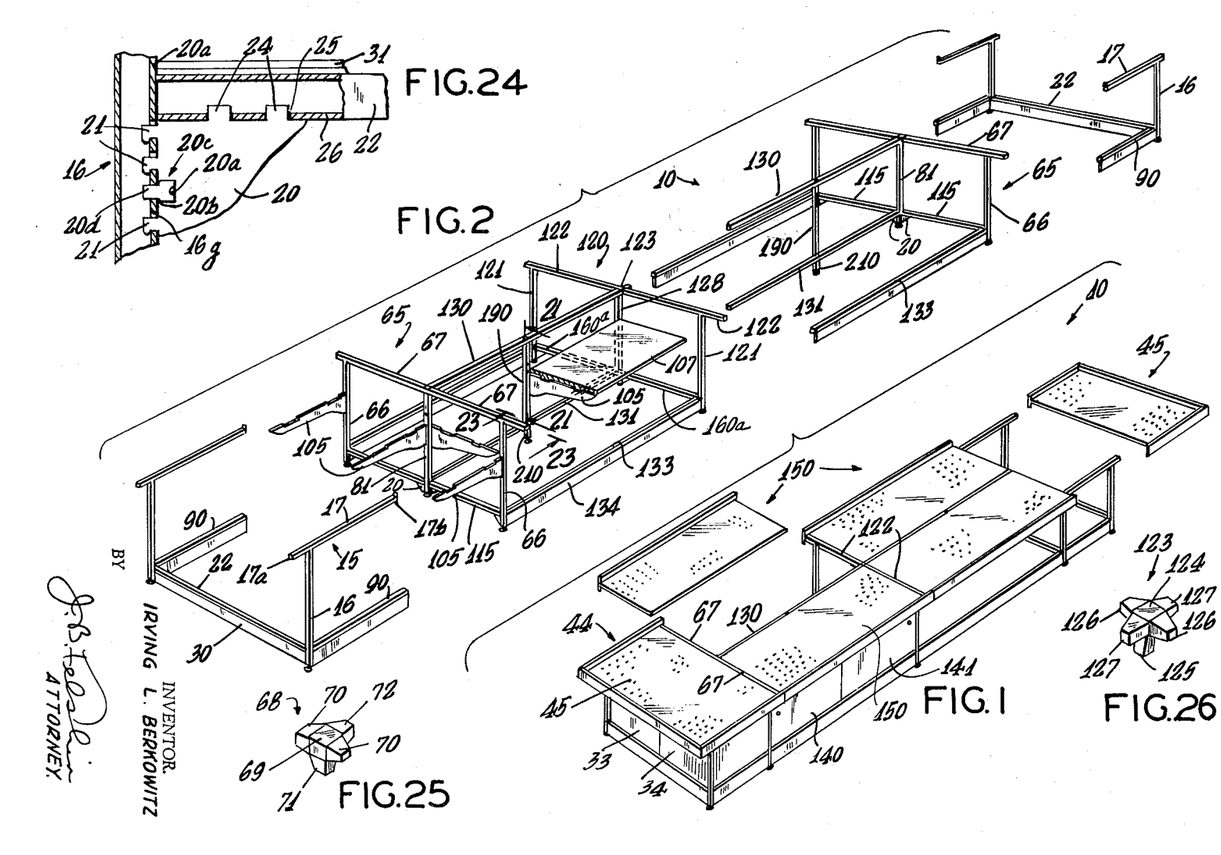
FIG. 1 is an exploded, perspective view of my improved counter.
FIG. 2 is a perspective, exploded view of its framework.
FIG. 24 is a vertical detail of the support for one end of the front connector tube.
FIG. 25 is a perspective view of a four way connector fitting.
FIG. 26 is a perspective view of a five way fitting.
Figure 3:
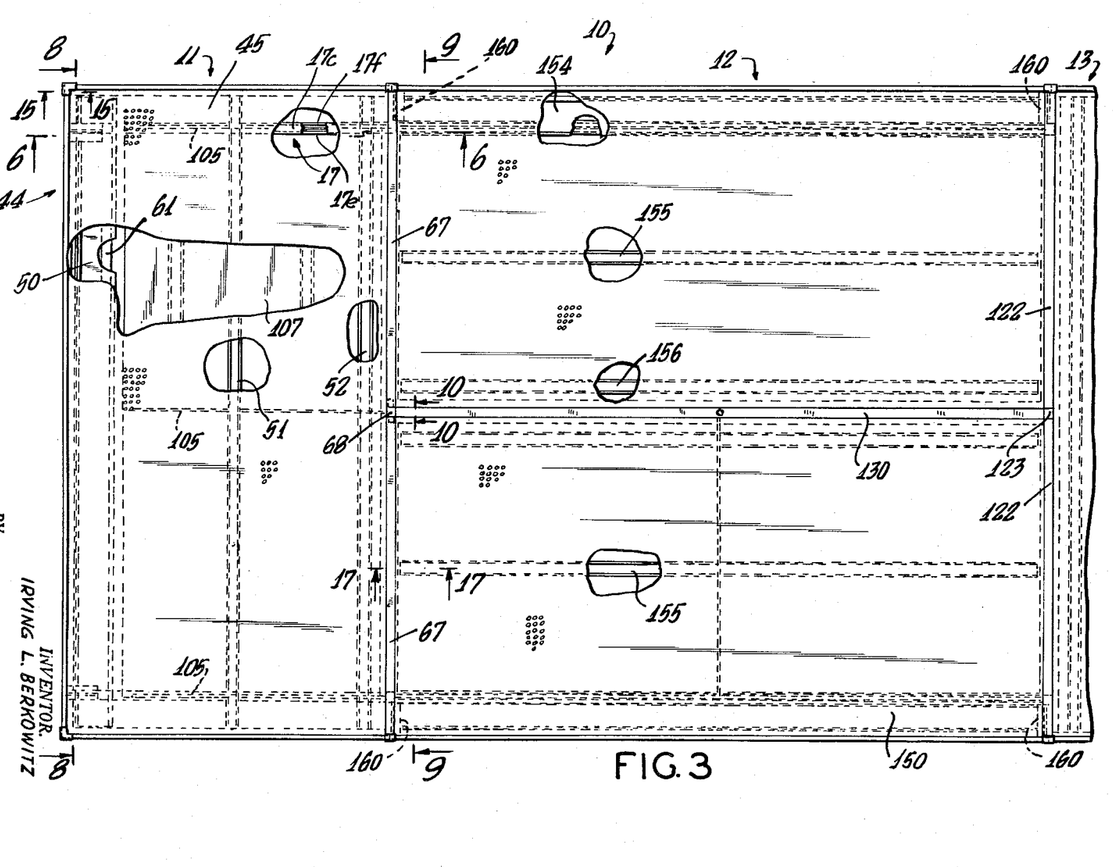
FIG. 3 is a partial top plan view of a display and storage fixture embodying the invention.

The added double unit 13 is similar and symmetrical to unit 12 about the center members 120, 123, 128. The opposite end unit shown in FIGS. 1 and 2 is symmetrical to the end unit 11 described and attaches to the outer end of unit 13. At the joints between counter top 44 and adjacent counter tops 150, and between adjacent counter tops 150 of the units 12 and 13 are bands 240 (FIG. 20) to cover the joints or adjacent edges. The band 240 has an outer inclined portion 241 and top and bottom flanges 242, 243 to snap onto the top and bottom of the mouldings, respectively. The mouldings for the counter tops extend beyond the ends thereof to overlap the tubular portions between the counter tops and it is these extensions which are jointed by the bands 240.

Figure 9:
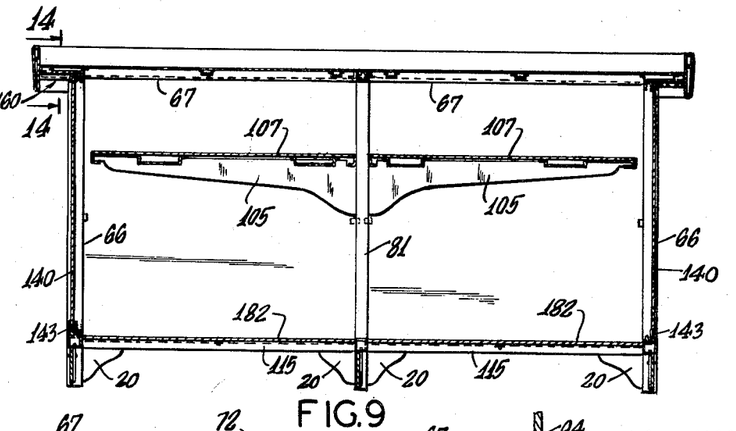
FIG. 9 is a cross-sectional view taken on line 9—9 of FIG. 3.
Figure 10:
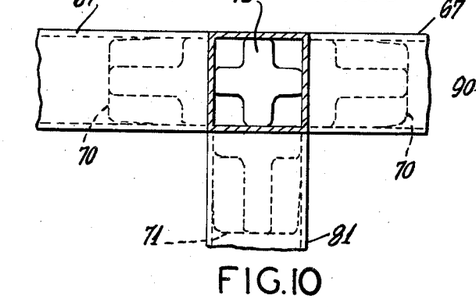
FIG. 10 is a cross-sectional view taken on line 10—10 of FIG. 3.

The posts 81, 190, 128 are formed at opposite sides with upper rows of slots similar to slots 66f to receive hooks of brackets 105 for supporting shelves 107 (FIG. 9).

It will be understood that any number of additional units 13 may be interposed between the unit 13 shown and the outer end unit 11.

The counter may comprise only one end unit 11 or the combination of one unit 11 and one unit 12, or one unit 11, one unit 12 and one unit 13.

It will thus be seen that there is provided an apparatus in which the several objects of this invention are achieved, and which is well adapted to meet the conditions of practical use.

As possible embodiments might be made of the above invention, and as various changes might be made in the embodiment above set forth, it is to be understood that all matter herein set forth or shown in the accompanying drawings, is to be interpreted as illustrative and not in a limiting sense.

I claim:

1. A counter fixture comprising a pair of parallel aligned unitary members each having a vertical post from which integrally extends a horizontal portion, opposed symmetrical brackets removably mounted on the lower ends of said vertical posts and extending toward each other, a lower member mounted on said brackets and between said posts, a second pair of unitary members in a vertical common plane, having vertical posts in the planes of said first pair of members, respectively, and horizontal integral portions extending from said vertical posts of said second pair of members inwardly toward each other, means on the horizontal portions of the first pair of members to releasably interlock with the horizontal portion of said second pair of members, means to interconnect the inner ends of the horizontal portions of the second pair of members, opposed pairs of symmetrical brackets removably mounted on the posts of the first and second pair of members with the brackets of each pair extending toward each other, lower members mounted on said pairs of brackets, and a counter top slidably mounted on and having means slidably engaging the horizontal portions of the first pair of members, and abutting the horizontal portions of the second pair of members.

2. The combination of claim 1, in combination with a kick plate attached to each pair of opposed brackets.

3. The combination of claim 1, in combination with a bottom panel removably mounted on said lower members.

4. The combination of claim 3, in combination with tracks on said lower members, a track at the underside of the counter, and a sliding door on and between said tracks.

5. The combination of claim 3, in combination with a vertical panel between one of the lower members and the horizontal portion of one of said first pair of members.

6. The combination of claim 3, in combination with brackets removably mounted on the posts of said second pair of members, and a shelf mounted on the last named brackets.

7. In combination, a first pair of members disposed in parallel planes, a second pair of members disposed in a common plane, perpendicular to said parallel planes and located at adjacent ends of said first pair of members and extending toward each other, means to detachably interconnect said adjacent ends of said first pair of members to the outer ends of said second pair of members, means to detachably attach the inner ends of said second pair of members to each other, means to detachably attach said first pair of members to each other to retain them in parallel planes, a counter top removably and slidably mounted on and having means slidably engaging guide means on said pair of parallel members, with one end of said counter top located at the plane of said second pair of members in abutting relation thereto, when said counter top is fully mounted on said pair of parallel members, a third pair of members, the members of the third pair being in a common plane parallel to the second pair of members, means to releasably interconnect the inner ends of said third pair of members to each other, means to releasably connect said third pair of members to the second pair of members, respectively, and counter tops slidably and removably mounted on and between the second and third pairs of members.

8. The combination of claim 7, a pair of bottom walls, and means on said second and third pairs of members to removably support said pair of bottom walls.

9. The combination of claim 7, vertical center posts between the members of the second and third pairs of members, and upper and lower horizontal central longitudinal members interconnecting the upper and lower ends of said center posts.

10. The combination of claim 8, a pair of shelves, and means on said second and third members to removably support said pair of shelves.

11. The combination of claim 10, in combination with a vertical post interposed between said upper and lower horizontal members, and a leg post beneath said lower horizontal member and aligned with the last mentioned post, brackets removably mounted on said vertical posts, and shelves removably mounted on said last mentioned brackets.

12. In combination, a pair of tubular vertical posts each having at least one vertical slot with the slot of one post facing the slot in the other post, brackets having hooks extending through said slots and engaging walls of said posts, said brackets extending toward each other in a common plane, a transverse member having its ends resting on said brackets, said brackets each being formed with a notch adjacent its post, a locking tab in each notch, each of said posts having an additional slot, and each of said locking tabs having a lug projecting into one of said additional slots, to prevent said brackets from moving longitudinally relative to said posts.

13. The combination of claim 12, said transverse member comprising a tube, having slots facing the brackets, and said brackets having lugs projecting into the slots in said transverse member.

14. The combination of claim 13, an apron attached to said brackets, a locking tab attached to said apron, said transverse tube having an additional slot and a lug on said last locking tab projecting into said additional slot.

15. In combination, a first pair of members in parallel planes and each having a vertical portion and an integral upper horizontal portion, said vertical portions being in a common plane, a second pair of members located in a common plane perpendicular to said parallel planes, and each comprising a vertical portion and an integral upper horizontal portion with said horizontal portions extending toward each other, said horizontal portions of said first pair of members extending from the vertical portions of said first pair of members toward said second pair of members, means to detachably connect the outer ends of the horizontal portions of said second pair of members to said first pair of members, means to detachably connect the inner ends of said horizontal portions of said second pair of members to each other, a counter top slidably and removably mounted on the horizontal portions of said first pair of members and at the level of and abutting the horizontal portions of the second pair of members, means to detachably interconnect the lower ends of vertical portions of said first pair of members to each other, and means to detachably attach the lower ends of the vertical portions of the first pair of members to the lower ends of the vertical portions of said second pair of members, the horizontal portions of said second pair of members being located in the plane of said counter top and above the level of the horizontal portions of said first pair of members, a third pair of parallel members in a common plane parallel to and spaced from the second pair of parallel members, and each having a vertical portion and an upper integral horizontal portion, with the horizontal portions of said third pair of members extending toward each other and located in a horizontal plane, means to detachably attach the lower ends of the vertical portions of said second pair of members to the lower ends of the vertical portions of said third pair of members, means to detachably connect the inner ends of the horizontal portions of said third pair of members to each other, and a pair of counter tops slidably mounted on the horizontal portions of said second and third members and movable toward and away from each other.

16. The combination of claim 15, center posts between the inner ends of the horizontal portions of said second and third members, and means to detachably attach the lower ends of the vertical portions of said second and third pair of members to said center posts.

17. A counter fixture comprising a pair of parallel aligned unitary members each having a vertical post from which integrally extends a horizontal portion, opposed symmetrical brackets removably mounted on the lower ends of said vertical posts and extending toward each other, a lower member mounted on said brackets and between said posts, a second pair of unitary members in a vertical common plane, having vertical posts in the planes of said first pair of members, respectively, and horizontal integral portions extending from said vertical posts of said second pair of members inwardly toward each other, means on the horizontal portions of the first pair of members to releasably interlock with the horizontal portions of said second pair of members, means to interconnect the inner ends of the horizontal portions of the second pair of members, opposed pairs of symmetrical brackets removably mounted on the posts of the first and second pair of members with the brackets of each pair extending toward each other, lower members mounted on said pairs of brackets, and a counter top slidably mounted on and having means slidably engaging the horizontal portions of the first pair of members, and abutting the horizontal portions of the second pair of members, a center post between the posts of the second pair of members, removably connected at its upper end to the means which interconnects the inner ends of said horizontal portions of the second pair of members, pairs of opposed brackets at the lower ends of the posts of the second pair of members and said center post, and lower members mounted on said last named brackets and interposed between said center-post and the posts of said second pair of members, and a bottom plate removably mounted on all of said lower members.

18. A counter fixture comprising a pair of parallel aligned unitary members each having a vertical post from which integrally extends a horizontal portion, opposed symmetrical brackets removably mounted on the lower ends of said vertical posts and extending toward each other, a lower member mounted on said brackets and between said posts, a second pair of unitary members in a vertical common plane, having vertical posts in the planes of said first pair of members, respectively, and horizontal integral portions extending from said vertical posts of said second pair of members inwardly toward each other, means on the horizontal portions of the first pair of members to releasably interlock with the horizontal portions of said second pair of members, means to interconnect the inner ends of the horizontal portions of the second pair of members, opposed pairs of symmetrical brackets removably mounted on the posts of the first and second pair of members with the brackets of each pair extending toward each other, lower members mounted on said pairs of brackets, and a counter top slidably mounted on and having means slidably engaging the horizontal portions of the first pair of members and abutting the horizontal portions of the second pair of members, said counter top comprising a counter top wall, and a moulding attached to an edge thereof and extending above and below said top wall.

19. A counter fixture comprising a pair of parallel aligned unitary members each having a vertical post from which integrally extends a horizontal portion, opposed symmetrical brackets removably mounted on the lower ends of said vertical posts and extending toward each other, a lower member mounted on said brackets and between said posts, a second pair of unitary members in a vertical common plane, having vertical posts in the planes of said first pair of members, respectively, and horizontal integral portions extending from said vertical posts of said second pair of members inwardly toward each other, means on the horizontal portions of the first pair of members to releasably interlock with the horizontal portions of said second pair of members, means to interconnect the inner ends of the horizontal portions of the second pair of members, opposed pairs of symmetrical brackets removably mounted on the posts of the first and second pair of members with the brackets of each pair extending toward each other, lower members mounted on said pairs of brackets, and a counter top slidably mounted on and having means slidably engaging the horizontal portions of the first pair of members and abutting the horizontal portions of the second pair of members, said counter top comprising a perforated sheet metal top wall and reinforcing channels fixed to the underside of said top wall.

20. A counter fixture comprising a pair of parallel aligned unitary members each having a vertical post from which integrally extends a horizontal portion, opposed symmetrical brackets removably mounted on the lower ends of said vertical posts and extending toward each other, a lower member mounted on said brackets and between said posts, a second pair of unitary members in a vertical common plane, having vertical posts in the planes of said first pair of members, respectively, and horizontal integral portions extending from said vertical posts of said second pair of members inwardly toward each other, means on the horizontal portions of the first pair of members to releasably interlock with the horizontal portions of said second pair of members, means to interconnect the inner ends of the horizontal portions of the second pair of members, opposed pairs of symmetrical brackets removably mounted on the posts of the first and second pair of members with the brackets of each pair extending toward each other, lower members mounted on said pairs of brackets, and a counter top slidably mounted on and having means slidably engaging the horizontal portions of the first pair of members and abutting the horizontal portions of the second pair of members, said first pairs of members comprising tubes of square cross-section, the horizontal portions of said pair of members having slots in the lower walls thereof, said counter top comprising a top wall, and clips fixed to the top wall and having portions slidably extending through said slots and portions engaging upper surfaces of said bottom walls.

References Cited by the Examiner

UNITED STATES PATENTS

| | | | |
|---|---|---|---|
| 1,473,817 | 11/23 | Gorsline | 312—108 X |
| 1,520,517 | 12/24 | Thomason | 311—108 |
| 1,846,485 | 2/32 | Hart | 312—140 X |
| 1,865,734 | 7/32 | Wieland | 312—140 X |
| 2,148,892 | 2/39 | Bales | 312—140.3 |
| 2,643,170 | 6/53 | Vanderveld | 312—108 |
| 2,654,487 | 10/53 | Degner | 211—182 X |
| 2,766,092 | 10/56 | Dennison | 311—108 |
| 2,787,382 | 4/57 | Williams | 312—108 X |
| 2,930,638 | 3/60 | Morrissey | 211—182 X |
| 2,934,181 | 4/60 | Weber | 312—108 X |

FOREIGN PATENTS 793,017    11/35    France.

FRANK B. SHERRY, *Primary Examiner.*

CHANCELLOR E. HARRIS, *Examiner.*